United States Patent [19]
Ekudden et al.

[11] Patent Number: 6,163,577
[45] Date of Patent: *Dec. 19, 2000

[54] SOURCE/CHANNEL ENCODING MODE CONTROL METHOD AND APPARATUS

[75] Inventors: Erik Ekudden, Åkersberga; Jim Sundqvist, Luleå; Tor Björn Minde, Gammelstad, all of Sweden; Karl Hellwig, Wonfurt, Germany

[73] Assignee: Telefonaktiebolaget LM Ericsson (publ), Stockholm, Sweden

[ * ] Notice: This patent is subject to a terminal disclaimer.

[21] Appl. No.: 08/845,468

[22] Filed: Apr. 25, 1997

[30] Foreign Application Priority Data

Apr. 26, 1996 [SE] Sweden .................................. 9601606

[51] Int. Cl.⁷ .................................................. H04B 14/04
[52] U.S. Cl. .......................... 375/242; 375/262; 375/295; 370/252; 370/347; 704/207
[58] Field of Search ..................................... 375/242, 262, 375/295, 219; 371/37.01; 704/229, 222, 207; 370/280, 336, 252, 223, 220, 347

[56] References Cited

U.S. PATENT DOCUMENTS

| | | | |
|---|---|---|---|
| 4,184,049 | 1/1980 | Crochiere et al. | 704/229 |
| 5,353,373 | 10/1994 | Drogo de Iacovo et al. | 704/220 |
| 5,416,779 | 5/1995 | Barnes et al. | 370/280 |
| 5,469,527 | 11/1995 | Drogo de Iacovo et al. | 704/223 |
| 5,666,370 | 9/1997 | Ganesan et al. | 371/37.01 |
| 5,701,294 | 12/1997 | Ward et al. | 370/252 |
| 5,982,766 | 11/1999 | Nystrom et al. | 370/347 |

FOREIGN PATENT DOCUMENTS

| | | |
|---|---|---|
| 0 631 402 | 12/1994 | European Pat. Off. . |
| WO94/07313 | 3/1994 | WIPO . |
| WO94/19882 | 9/1994 | WIPO . |
| WO97/13388 | 4/1997 | WIPO . |

OTHER PUBLICATIONS

J. Dunlop et al., "Estimation of the Performance of an Adaptive Air Interface in Mobile Radio," Alcatel Radiotelephone, pp. 1–5.

D.J. Goodman et al., "Quality of Service and Bandwidth Efficiency of Cellular Mobile Radio with Variable Bit–Rate Speech Transmission," IEEE (1983).

J. Irvine et al., "Implementation Considerations for Gross Rate Link Adaptation," IEEE, pp. 1766–1770 (1996).

E. Le Strat et al., "Distance Based Dynamic Adaptation of the Air Interface in TDMA," Alcatel Mobile Communication France, pp. 208–215.

*Primary Examiner*—Stephen Chin
*Assistant Examiner*—Shuwang Liu
*Attorney, Agent, or Firm*—Burns, Doane, Swecker & Mathis, L.L.P.

[57] ABSTRACT

A source/channel encoding mode control method in a TDMA radio communication system determines the current type of source signal to be encoded and transmitted, restricts encoding to a class of source/channel encoding modes compatible with the determined type of source signal, determines a quality measure for previously transmitted signals that have been received and decoded, and selects based on the quality measure, the most suitable source/channel encoding mode for the determined class.

11 Claims, 5 Drawing Sheets

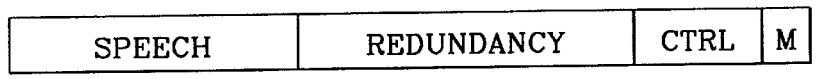
Fig. 9
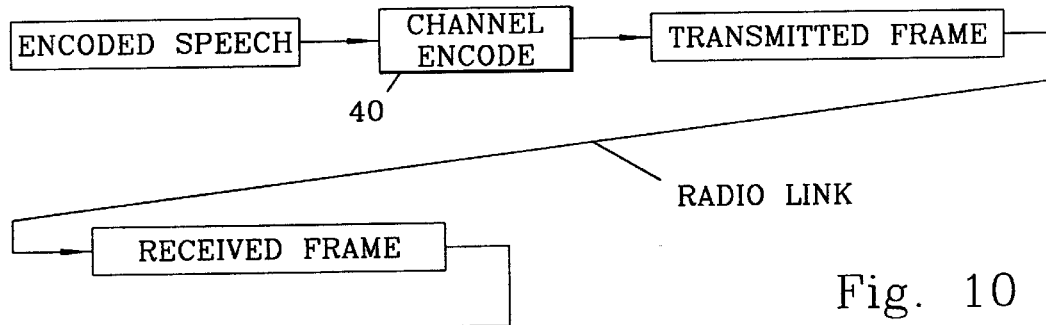
Fig. 10
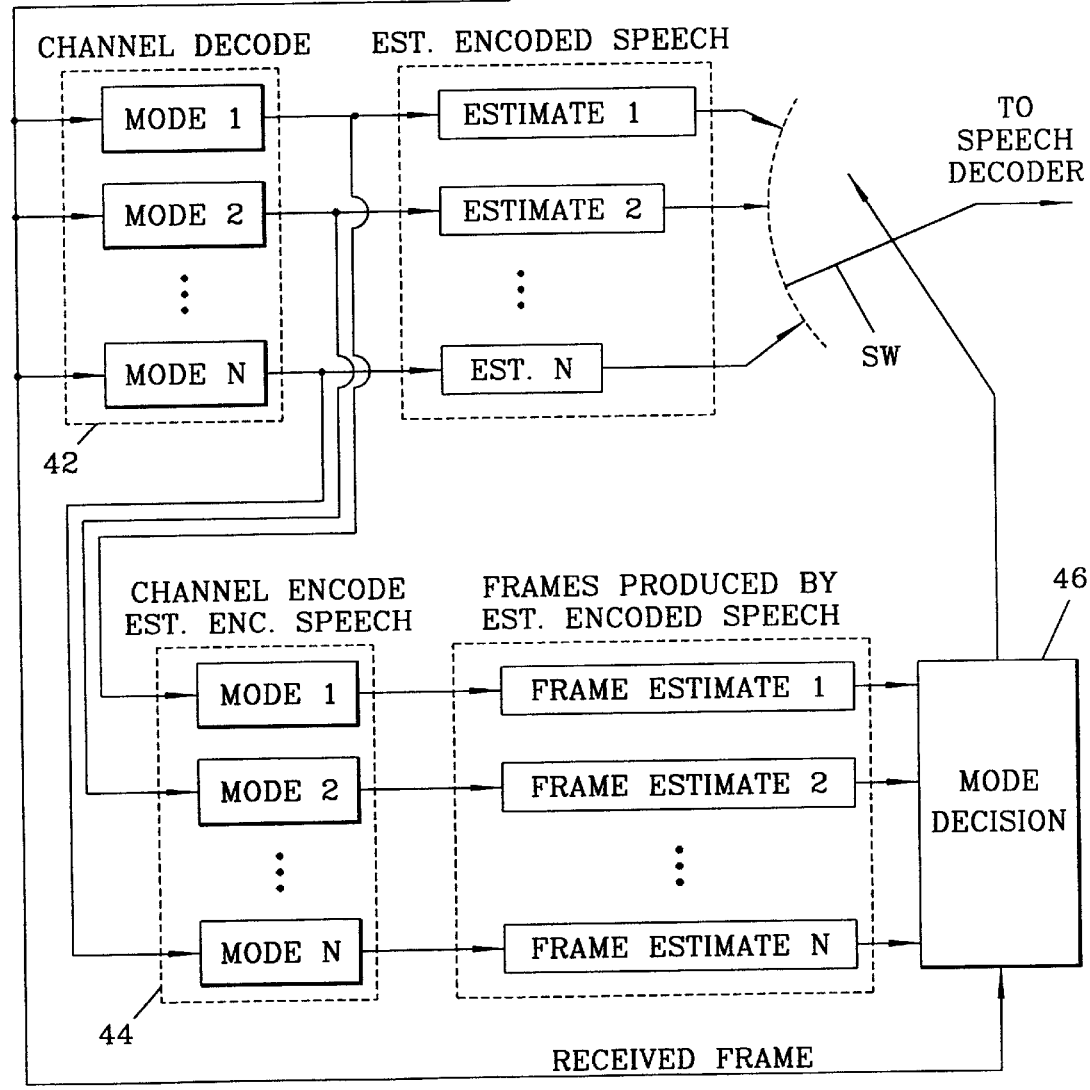

////

SOURCE/CHANNEL ENCODING MODE CONTROL METHOD AND APPARATUS

TECHNICAL FIELD

The present invention relates to a source/channel encoding mode control method in a digital radio communication system.

BACKGROUND

Speech and channel encoding schemes in cellular TDMA systems of today use static allocation of source and channel encoding bit rate as well as static allocation of source and channel encoding algorithm. That is, regardless of the changing character of the speech signal and the changing radio conditions an allocated source/channel encoding mode will be maintained for the duration of a call.

However, for certain input source signals the allocated source encoding bit rate may not be sufficient, or the source encoding algorithm may not be adequate, to encode the signal with the desired high quality. Furthermore, when radio conditions become poor the received speech quality will also bee poor, since the protection provided by the channel encoding will be insufficient. Thus, the static mode allocation is a limiting factor with respect to the range of conditions over which the speech transmission service can offer acceptable quality.

Thus, there is a need for a more flexible source/channel encoding mode control system that dynamically adapts, within the same total gross bit rate (the total bit rate available for information transfer on a given channel if no channel protection is provided), the encoding mode to prevailing conditions, such that more channel protection is used on poor channels than on good or almost error free channels, where the bits instead may be used to increase the quality of the source coding.

Citation [1] describes a speech/channel encoding mode control system in which different encoding modes are used for voiced and unvoiced speech, such that voiced speech uses less bits for speech encoding and more bits for channel encoding than unvoiced speech. During time periods of poor radio conditions the encoder is instructed to override this approach by using the more protected mode regardless of the voiced or unvoiced nature of the speech signal.

SUMMARY OF THE INVENTION

Accordingly it is an object of the present invention to provide a source/channel encoding mode control method in a digital radio communication system, which method dynamically adapts, within the same total gross bit rate, the encoding mode to the current type of source signal and the current radio conditions.

This object is solved by a method in accordance with claim 1.

Briefly, according to the present invention the current type of source signal to be encoded determines a suitable class of source/channel encoding modes while the current radio conditions determine a specific mode in that class.

BRIEF DESCRIPTION OF THE DRAWINGS

The invention, together with further objects and advantages thereof, may best be understood by making reference to the following description taken together with the accompanying drawings, in which:

FIG. 9 is a schematic diagram illustrating a frame in which mode information is transmitted in a mode indicator; and FIG. 10 is a schematic diagram illustrating a method of implicitly determining the transmitted mode at the receiver.

DETAILED DESCRIPTION

The present invention will now be described with reference to a TDMA system. However, it is to be understood that the invention is also applicable to other digital radio communication systems, such as FDMA and CDMA systems.

An essential feature of the present invention is variable source/channel encoding within the same total gross bit rate. This feature will now be described with reference to FIGS. 1–3.

Figure 1:
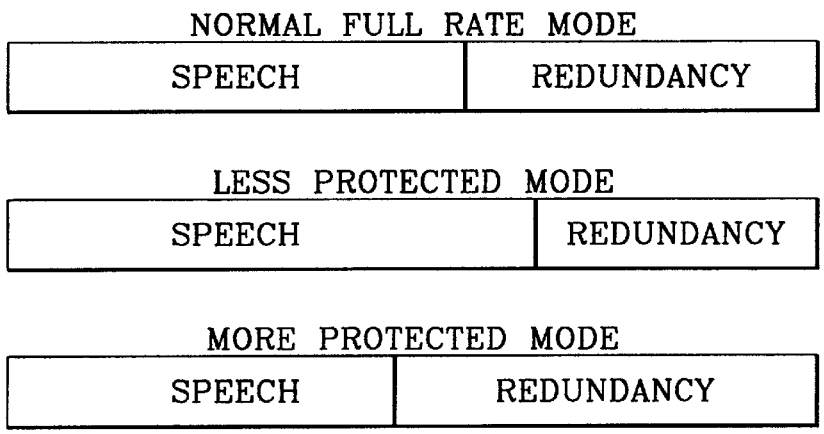
FIG. 1 is a schematic diagram illustrating different source/channel encoding modes all having the same gross bit rate.

FIG. 1 illustrates the underlying concept. In normal full rate mode a transmitted frame will have a certain proportion between encoded speech and redundancy caused by the channel encoding. This is represented by the top frame in FIG. 1. If speech is encoded more accurately, less redundancy is available for channel encoding within the same frame length (the same gross bit rate). This is represented by the middle frame in FIG. 1. Finally, the bottom frame in FIG. 1 represents the opposite, namely a more protected mode in which speech is less accurately encoded but more protected by increasing the amount of redundancy available for channel encoding.

Figure 2:
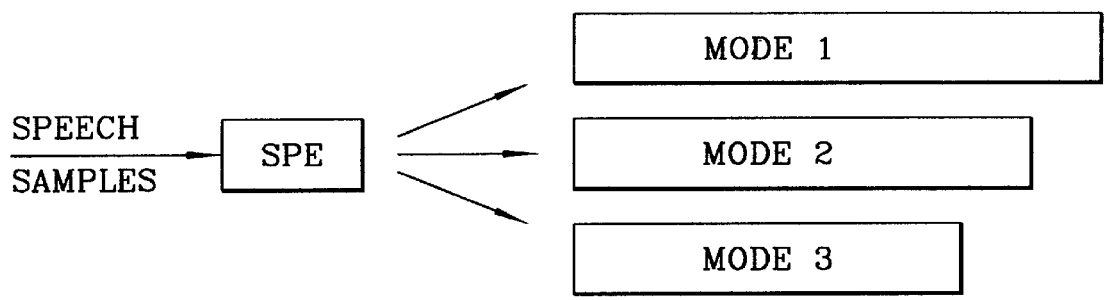
FIG. 2 is a schematic diagram illustrating a variable rate speech encoder having different source encoding modes.
Figure 3:
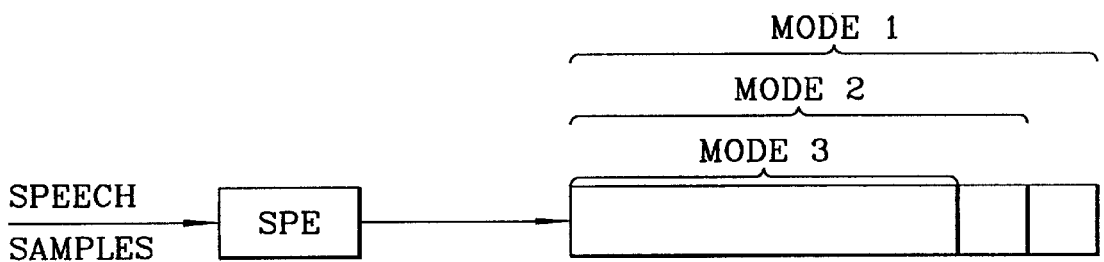
FIG. 3 is a schematic diagram illustrating a speech encoder using embedded source encoding.

Known methods to change the source or speech encoding rate are illustrated in FIGS. 2 and 3.

FIG. 2 illustrates variable rate coding. Speech samples are forwarded to a speech encoder SPE, which encodes the incoming bit stream into different bit rates or modes. In this case the speech encoder SPE has to be informed about which rate to use for encoding.

FIG. 3 illustrates another method, namely embedded speech encoding. This method is described in detail in citations [2,3]. In this case the speech samples are encoded into a constant rate bit stream. The encoding is performed in such a way that the most accurate encoding (MODE1) is obtained by retaining all of the bits from the encoder. Less accurate modes are obtained by discarding portions of the bit stream from the encoder. The advantage of this type of encoding is that the speech encoder does not have to be informed of which mode to use. Instead only the channel encoder has to be informed of the selected mode and thereafter extracts the corresponding information from the bit stream from the speech encoder.

Instead of using a fixed allocation of source and channel encoding as in the prior art, the idea of the present invention is to use a dynamically varying mode scheme within the same fixed gross bit rate, where the overall goal is to achieve the highest possible perceptual quality on the receiving end. The mode decision is taken on a frame by frame basis and is preferably based on information regarding the quality of frames that have previously been received by the receiver.

Figure 4:
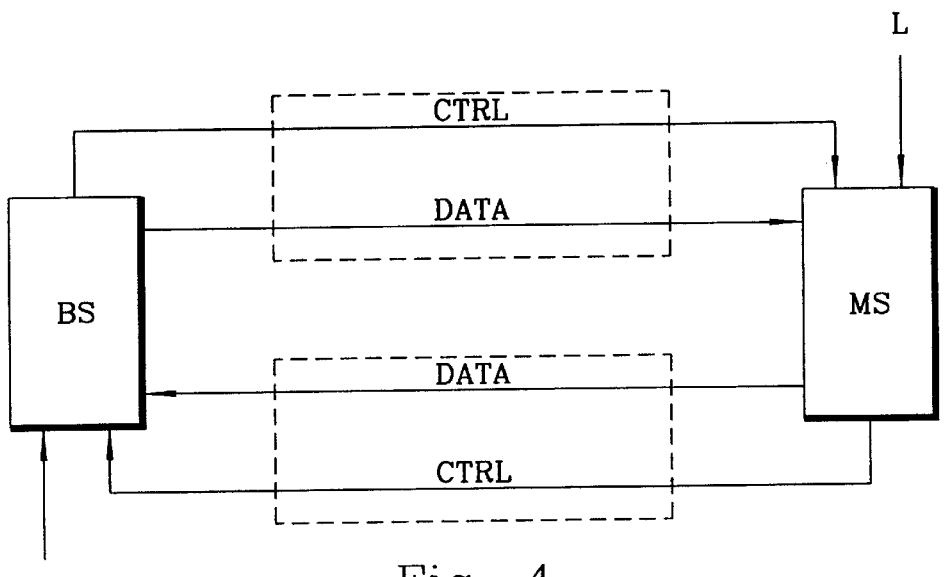
FIG. 4 is a block diagram illustrating a preferred system for performing the method in accordance with the present invention.

FIG. 4 is a block diagram illustrating a preferred system for performing the method in accordance with the present invention. A base station BS transmits data in dynamically varying encoding modes over a radio link to a mobile station MS. Similarly mobile station MS transmits data in dynamically varying modes to base station BS over a return radio link. Preferably each link also contains an inband control channel CTRL for transmission of measurements of received speech quality to the other end. Such measurements may include estimated residual bit error rate, frame erasure rate, measured signal strength and other radio channel related parameters at the receiving end. One or several of these parameters form a quality measure on which encoding mode decisions will be based.

The mode decision may also be partially based on local statistics at the transmitting end (represented by L in FIG. 4), such as time of day, date, location, system load, etc. This local information may also include previously received and stored speech quality measurements from the receiving end. The latter type of local information is of special importance in cases where the control channel is interrupted, as will be explained in detail below.

Figure 5:
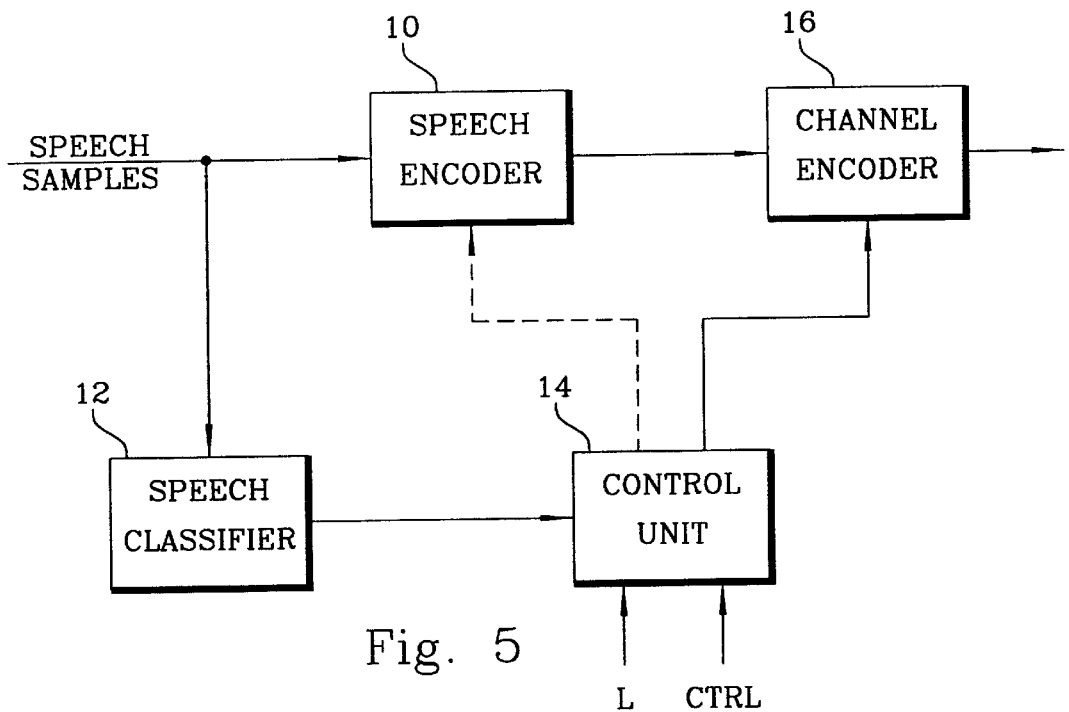
FIG. 5 is a block diagram illustrating a transmitter configured to perform the method in accordance with the present invention.

FIG. 5 is a block diagram illustrating a transmitter configured to perform the method in accordance with the present invention. Speech samples are forwarded to a speech encoder 10, which may be of the variable rate or embedded code type, and to a speech classifier 12. Speech classifier 12 determines the type of sound to be encoded. Different types of sound are, for example, voiced speech (for example "A", "E"), unvoiced speech ("S", "F"), background sounds (like car noise), music, etc. Each type of sound is associated with its corresponding class of encoding algorithms that are particularly suited for that type of sound. A control unit 14 is informed of the determined type of sound. Control unit 14 uses this information as well as the above mentioned local (L) and transmitted (CTRL) information to decide on which speech/channel encoding mode to use within the determined class. If radio conditions are good a mode with accurate encoding of the source signal and a low channel encoding overhead is used. If radio conditions are poor a more robust mode with less accurate source encoding and a higher channel encoding overhead is used.

Control unit 14 forwards the mode decision to channel encoder 16. If an embedded speech encoder is used there is no need to inform speech encoder 10. On the other hand, if a variable rate speech encoder is used encoder 10 will also be informed of the mode decision. This case is indicated by the dashed connection between control unit 14 and speech encoder 10 in FIG. 5.

The various blocks in FIG. 5 are typically implemented by a micro processor or a micro/signal processor combination.

Figure 6:
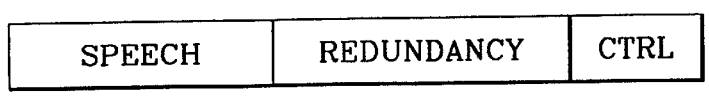
FIG. 6 is a schematic diagram illustrating a frame in which quality information is transmitted in a control channel.

As noted above measurements at the receiving end are preferably transmitted back to the transmitting end over a control channel CTRL. As illustrated in FIG. 6 this control channel CTRL has to be squeezed into the same frame as the useful information. Thus, the source/channel encoding modes should, whenever possible, be designed in a way that leaves room for the control channel CTRL. This is, however, not always possible, as illustrated by FIG. 7.

Figure 7:
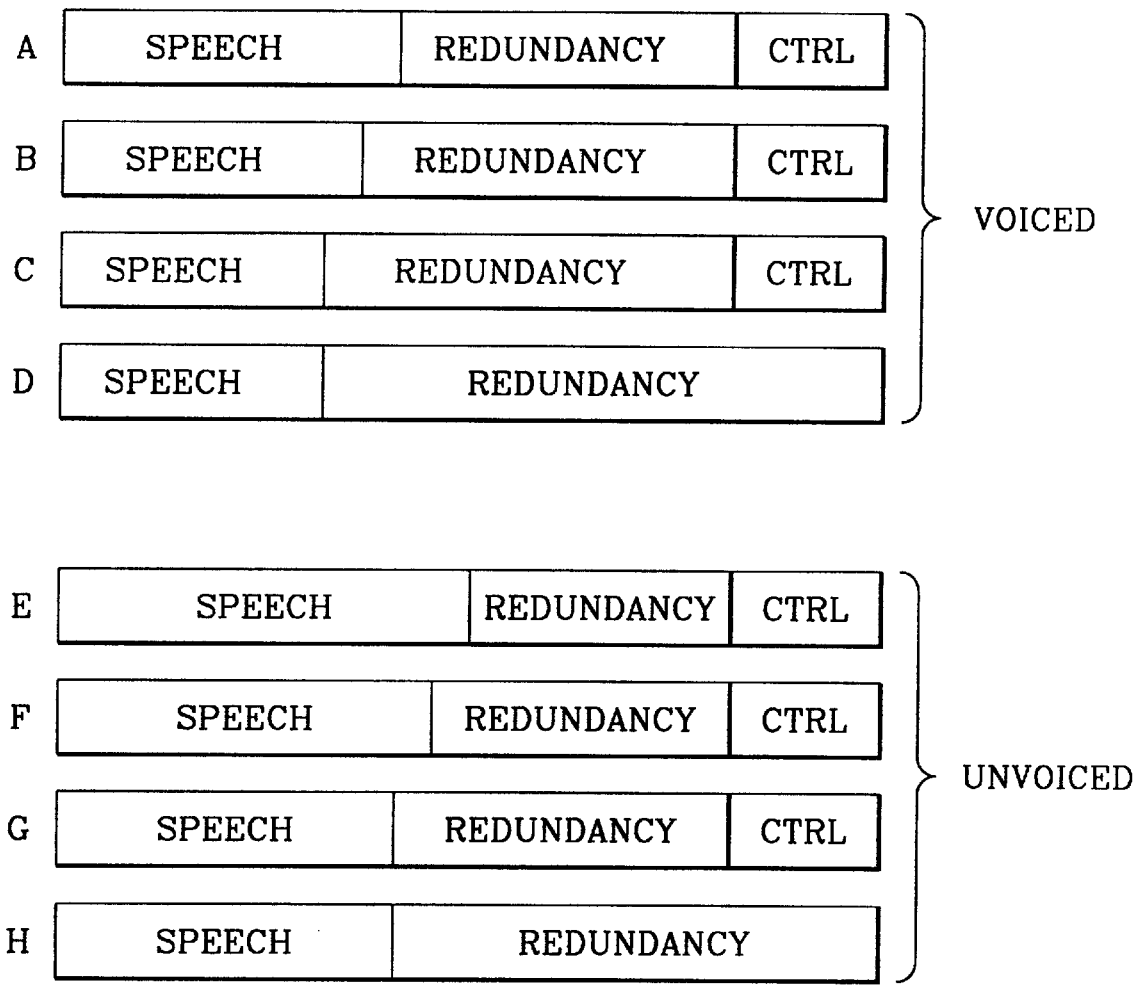
FIG. 7 is a schematic diagram illustrating different source classes and corresponding encoding modes.

FIG. 7 illustrates the frame formats of two classes of sound, namely voiced and unvoiced speech. The class "voiced" speech contains four encoding modes A–D. Mode A is characterized by accurate speech encoding and a low channel encoding overhead and also contains a control channel for transfer of measurements. This mode is used when radio conditions are good. Mode B is an intermediate mode in which the channel protection has been increased. Mode C is a mode in which the channel protection has been further increased to cope with a rather bad radio link. Note that modes A–C all contain a control channel. However, for a really poor radio channel it may be necessary to use very strong channel protection, and since it may not be possible to further reduce the speech encoding bit rate, the only possibility is to use a mode in which the control channel CTRL is discarded in favour of the channel protection (this may also be the case for some sources that require a higher bit rate).

The class "unvoiced" speech contains similar encoding modes E–H. However, note that more bits may have to be used for speech encoding in this class due to a more complex structure of transient speech, non-stationary "unvoiced" speech or music, for example.

When there is no inband control channel available for transfer of quality information, the station at the other end will have to rely on the above mentioned local information in deciding which source/channel encoding mode to use in a determined source class. Here the previously received and locally stored quality information is of special importance, since radio conditions usually are expected to remain constant over a few frames.

At the other extreme, when an inband control channel requiring most or all of the available space of a frame, like the FACCH (FACCH=Fast Associated Control Channel), has to be activated, the present invention provides a mechanism for activating the control channel when it does not compete with speech information. Thus, the classification of the present invention may be used to determine when there are speech pauses ("non-speech" classes), and to activate or delay activation of, for example, the FACCH to such speech pauses. In effect this partial or full "frame stealing" implies having encoding modes for "non-speech" classes requiring very few or no bits for source/channel encoding. These bits may, for example, instruct the decoder at the receiving end to replace the present frame with decoded sound from the previous frame or with "comfort" sound.

Figure 8:
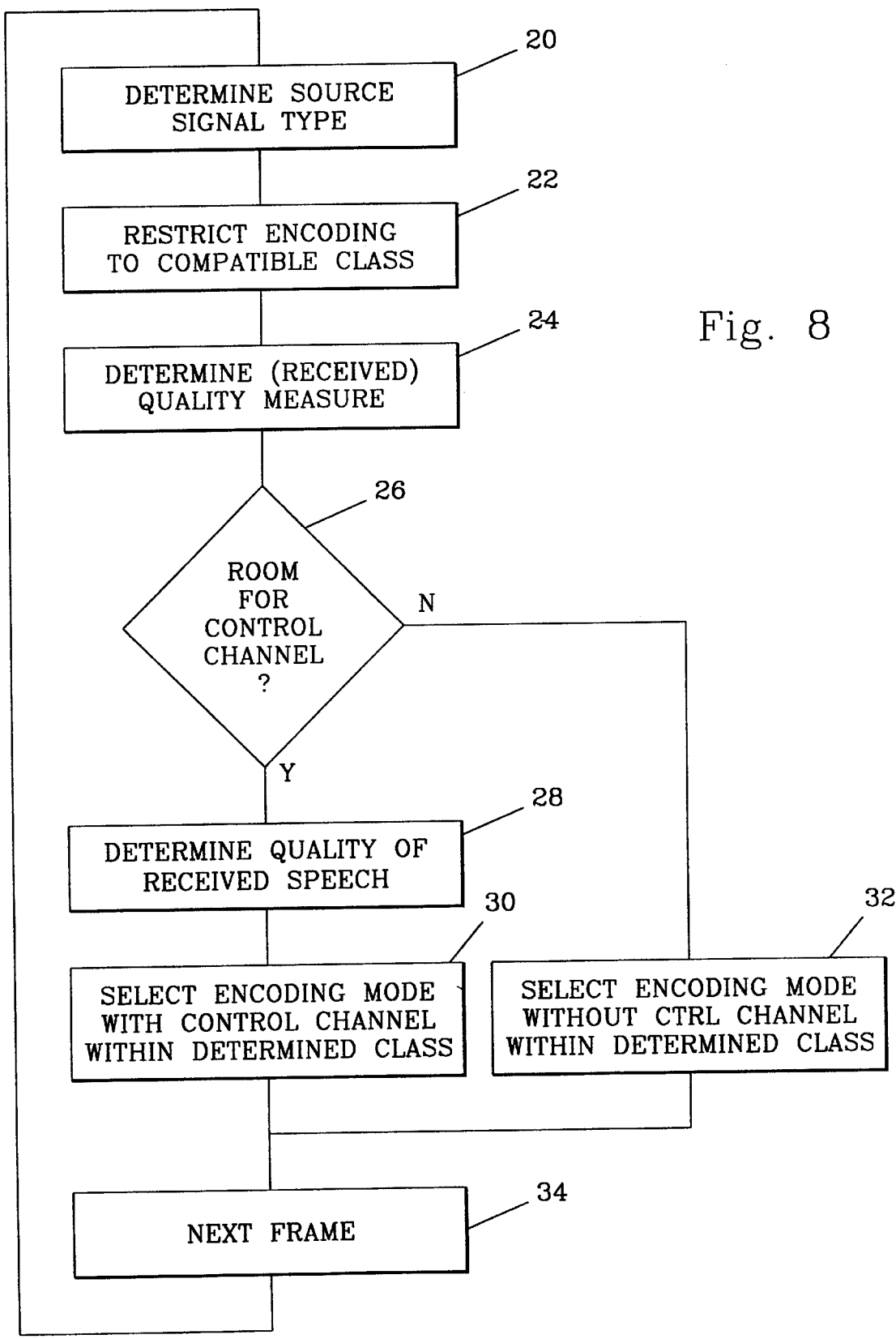
FIG. 8 is a flow chart illustrating a preferred embodiment of the method in accordance with the present invention.

FIG. 8 is a flow chart illustrating a preferred embodiment of the method in accordance with the present invention. In step 20 the source signal type of the current frame is determined. Step 22 restricts the source/channel encoding to an encoding class compatible with that type of source signal. Step 24 determines the quality measure received on control channel CTRL. Step 26 determines whether this quality measure requires normal encoding with room for a control channel or very robust encoding without a control channel. In the first case the algorithm proceeds to step 28, where the quality of speech received at the transmitting end is determined. A corresponding quality measure will be transmitted on the control channel CTRL to the receiver. In step 30 an encoding mode with such a control channel is selected within the determined class of encoding modes. On the other hand, if very robust encoding is required step 32 selects an encoding mode without control channel within the determined class of encoding modes. Finally the algorithm proceeds to step 34, in which the next frame is processed.

Since the present invention suggest use of dynamic mode allocation in the transmitter, there has to be a way for the receiver to determine the actually used mode for each frame. A simple method is illustrated in FIG. 9. In this embodiment a few bits of each frame are used as a mode indicator M. An advantage of this method is that the receiver may determine the current mode simply by determining the value of mode indicator M. However, a drawback of this embodiment is that the mode indicator requires bit space which has to be taken from the actual encoding of the useful signal. Another signaling approach is to discard the mode indicator field M and to use implicit signaling. Implicit signaling means that the receiver has to determine the actually used encoding mode by analyzing the received frame.

FIG. 10 illustrates a preferred embodiment of an implicit coding mode identification method. Encoded speech is channel encoded at the transmitter. This step is represented by block 40. The formed frame is transmitted over the radio link. The (possibly corrupted) received frame is channel decoded in every possible mode 1, . . . , N. This step is represented by block 42. The result is N estimates of the originally transmitted encoded speech, one estimate for each mode.

In the next step these estimates are used for channel encoding in block 44. The purpose of this channel encoding is to produce frame estimates corresponding to each encode speech estimate. These frame estimates are used in a mode decision represented by block 46. This mode decision is based on a comparison of each frame estimate with the actually received frame. The frame estimate that best matches (has the fewest differing bits) the received frame is considered to be the correct frame, and the corresponding encoded speech estimate is chosen by a switch SW and transferred to the speech decoder. The speech decoder may switch to the corresponding speech decoding mode by measuring the length of the encoded speech estimate. As an alternative block 46 may also control the speech decoding mode.

It is also possible to use a combination of the above two explicit and implicit signaling methods. In this combined method a class indicator is used to indicate the actual class of encoding modes, while the receiver implicitly has to determine the actually used encoding mode within that class. Such a method would require only a few bits in the class indicator field and would also simplify the trial decoding in the receiver, since only a few encoding modes have to be trial decoded.

One of the features of the present invention is that it optimizes perceived speech quality at the receiving ends by allowing independent (source signal controlled) mode changes (asymmetric modes). This optimization is possible due to the fast mode switching between a number of pre-optimized modes within a fixed gross bit rate. The fast mode switching is itself due to the the provided fast inband control channel.

It will be understood by those skilled in the art that various modifications and changes may be made to the present invention without departure from the spirit and scope thereof, which is defined by the appended claims.

CITATIONS

[1] WO 94/07313 assigned to ANT NACHRICHTEN-TECHNIK GMBH

[2] U.S. Pat. No. 5,353,373 assigned to Societa Italiano per l'Esercizio delle Telecomunicazioni P.A.

[3] U.S. Pat. No. 5,469,527 assigned to Societa Italiano per l'Esercizio delle Telecomunicazioni P.A.

What is claimed is:

1. A source/channel encoding mode control method in a digital radio communication system having a radio link from a transmitter to a receiver, comprising the steps of:
   determining a current type of source signal to be encoded and transmitted on the radio link;
   restricting encoding to a class of source/channel encoding modes compatible with the determined type of source signal, each mode in the class being defined by a different mix of source signal encoding and channel protection but the same total available gross bit rate;
   determining a quality measure for previously transmitted signals that have been received and decoded at the receiver; and
   selecting, based on the quality measure, a source/channel encoding mode from the class that is likely to give the best received and decoded signal at the receiver.

2. The method of claim 1, wherein the same steps are performed for signals transmitted on a return radio link from a receiver side to a transmitter side.

3. The method of claim 2, comprising the steps of:
   determining the quality measure at the receiver; and
   selecting, whenever available, a source/channel encoding mode in the receiver that also leaves room, within the total available gross bit rate, for an inband control channel for transmission of the quality measure on the return radio link.

4. The method of claim 1, comprising the step of trial decoding received signals in several decoding modes and selecting the most likely decoding mode.

5. The method of claim 1, wherein a mode indicator is included in the transmitted signal to indicate the selected source/channel encoding mode.

6. The method of claim 4, comprising the step of restricting the mode selection to a subset of all allowable source/channel encoding modes.

7. The method of claim 6, wherein only nearest neighbor modes, in terms of offered channel protection, of a current source/channel encoding mode are allowed.

8. The method of claim 1, comprising the step of activating a frame stealing control channel only if the determined type of source signal to be encoded allows such activation.

9. The method of claim 1, comprising the step of delaying activation of a frame stealing control channel until the determined type of source signal to be encoded allows such activation.

10. The method of claim 2, wherein independent source/channel encoding is used on the radio link and the return radio link.

11. A source/channel encoding mode control apparatus in a digital radio communication system having a radio link from a transmitter to a receiver, comprising:
   means for determining a current type of source signal to be encoded and transmitted on the radio link;
   means for restricting encoding to a class of source/channel encoding modes compatible with the determined type of source signal, each mode in the class being defined by a different mix of source signal encoding and channel protection but the same total available gross bit rate,
   means for determining a quality measure for previously transmitted signals that have been received and decoded at the receiver; and
   means for selecting, based on the quality measure, a source/channel encoding mode from the class that is likely to give the best received and decoded signal at the receiver.

* * * * *